United States Patent
Ajamian et al.

(10) Patent No.: US 11,346,568 B2
(45) Date of Patent: *May 31, 2022

(54) HVAC BALANCING AND OPTIMIZATION SYSTEMS

(71) Applicant: Ajamian Integrated Research Corp., San Anselmo, CA (US)

(72) Inventors: Michael Ajamian, San Anselmo, CA (US); James Irmiger, San Anselmo, CA (US)

(73) Assignee: AJAMIAN INTEGRATED RESEARCH CORP., San Anselmo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,146

(22) Filed: Dec. 7, 2020

(65) Prior Publication Data

US 2021/0108816 A1  Apr. 15, 2021

Related U.S. Application Data

(63) Continuation of application No. 16/357,163, filed on Mar. 18, 2019, now Pat. No. 10,859,282.

(60) Provisional application No. 62/645,058, filed on Mar. 19, 2018.

(51) Int. Cl.
  *F24F 11/30* (2018.01)
  *G05B 15/02* (2006.01)
  *F24F 11/63* (2018.01)
  *F24F 110/10* (2018.01)

(52) U.S. Cl.
  CPC .............. *F24F 11/30* (2018.01); *F24F 11/63* (2018.01); *G05B 15/02* (2013.01); *F24F 2110/10* (2018.01); *G05B 2219/2642* (2013.01)

(58) Field of Classification Search
  CPC ........ F24F 11/30; F24F 11/63; F24F 2110/10; G05B 15/02; G05B 2219/2642
  USPC ......................................................... 700/278
  See application file for complete search history.

(56) References Cited

U.S. PATENT DOCUMENTS

| | | |
|---|---|---|
| 7,168,627 B2 | 1/2007 | Kates |
| 8,033,479 B2 | 10/2011 | Kates |
| 8,695,888 B2 | 4/2014 | Kates |
| 9,182,140 B2 | 11/2015 | Kates |
| 9,316,407 B2 | 4/2016 | Kates |
| 9,618,222 B1 | 4/2017 | Hussain et al. |
| 9,995,497 B2 | 6/2018 | Kates |
| 10,126,011 B2 | 11/2018 | Kates |
| 10,215,437 B2 | 2/2019 | Kates |

(Continued)

*Primary Examiner* — Jigneshkumar C Patel
(74) *Attorney, Agent, or Firm* — Patterson + Sheridan LLP

(57) ABSTRACT

Certain aspects of the present disclosure relate to a system including a first active control device, comprising: a flow control element; one or more sensors; a network interface configured to connect to a mesh network; a memory comprising computer-executable instructions; and a processor configured to: execute the computer-executable instructions; receive local sensor data from the one or more sensors; receive remote sensor data from a remote sensing device; control a position of the flow control element based on one or more of the local sensor data or the remote sensor data; store the local sensor data and remote sensor data in the memory; and transmit the local sensor data and the remote sensor data to a second active control device via the mesh network.

20 Claims, 7 Drawing Sheets

(56) References Cited

U.S. PATENT DOCUMENTS

| | | | |
|---|---|---|---|
| 2005/0127196 A1* | 6/2005 | Gottlieb | F24F 11/30 236/51 |
| 2007/0178823 A1 | 8/2007 | Aronstam et al. | |
| 2008/0033599 A1* | 2/2008 | Aminpour | F24F 11/30 700/276 |
| 2011/0077758 A1* | 3/2011 | Tran | G16H 40/67 700/94 |
| 2011/0269389 A1* | 11/2011 | Scharf | F24F 13/1426 454/258 |
| 2012/0072031 A1* | 3/2012 | Elliott | G05D 23/1921 700/277 |
| 2014/0349566 A1 | 11/2014 | Lamb et al. | |
| 2015/0370927 A1* | 12/2015 | Flaherty | F24D 19/1084 703/1 |
| 2016/0291615 A1 | 10/2016 | Zakaria | |
| 2016/0377305 A1* | 12/2016 | Kwa | F24F 11/30 700/277 |
| 2017/0176034 A1 | 6/2017 | Hussain et al. | |

* cited by examiner

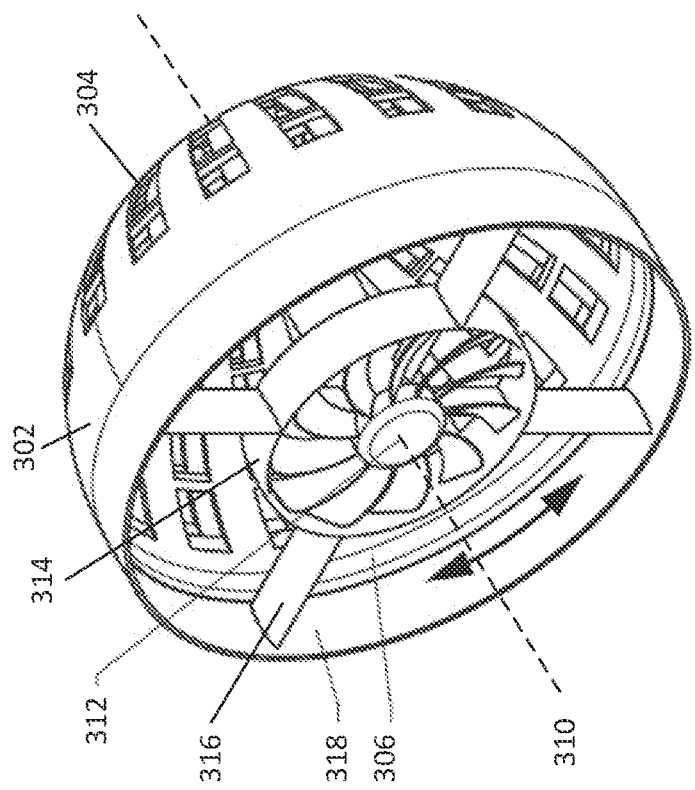
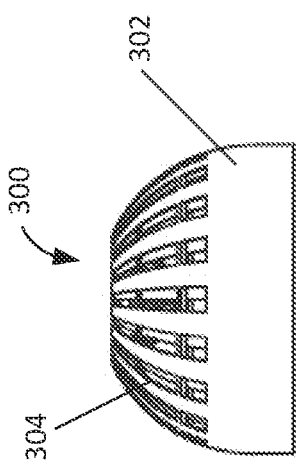
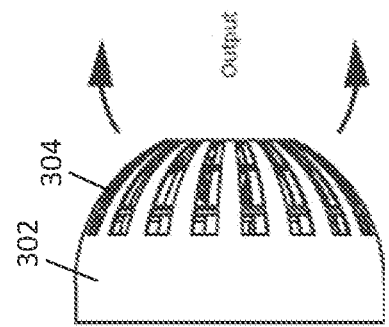
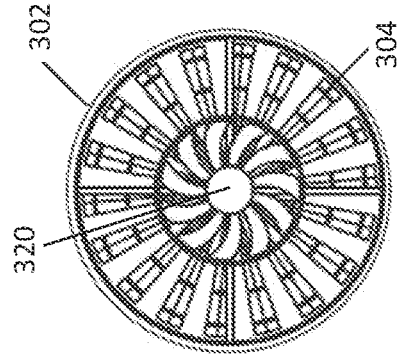

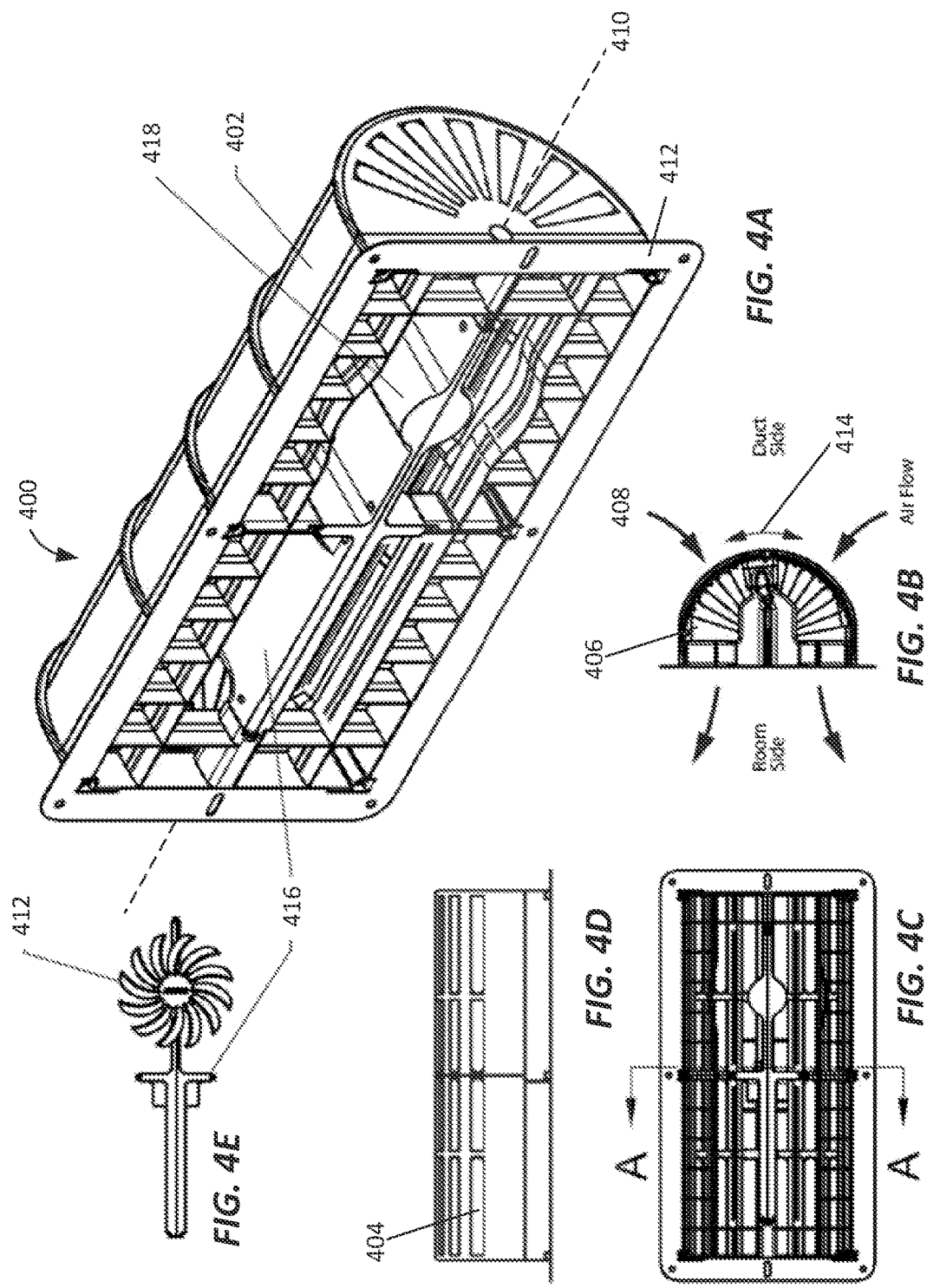

HVAC BALANCING AND OPTIMIZATION SYSTEMS

CROSS-REFERENCE TO RELATED APPLICATIONS

This application is a continuation of U.S. patent application Ser. No. 16/357,163, filed Mar. 18, 2019, which is now issued as U.S. Pat. No. 10,859,282, which claims the benefit of and priority to U.S. Provisional Patent Application No. 62/645,058, filed on Mar. 19, 2018, the entire contents of each of which are incorporated herein by reference.

INTRODUCTION

Aspects of the present disclosure relate to heating, ventilation, and air-conditioning (HVAC) balancing and optimization systems.

HVAC systems are deployed in many different types of structures, such as residential and commercial buildings. In many cases, an HVAC system will have a heating (e.g., furnace) or cooling (e.g., air conditioner) component that conditions air for many rooms or other spaces within a building. For example, a single home may have many rooms, but only one HVAC system to control the temperature of all of the rooms in the home. While efforts may be made during design and installation of the HVAC system to balance the output of the system in all of the rooms serviced by the HVAC system, often the HVAC systems will still produce uneven temperatures in different rooms. This may be due to, for example, unequal airflows to different rooms, differing geometries and characteristics of different rooms (e.g., location of the HVAC vent(s)), different run lengths between the HVAC equipment and the vents, and the like.

Mechanical design of conventional HVAC systems is not the only challenge to achieving even temperature distribution throughout different spaces in a building. Ambient conditions with respect to the building, such as sunny or shady sides of the building, may exacerbate existing uneven temperature distributions throughout the building. Even more, regular activities within a building, such as closing and opening doors, cooking, taking showers, opening and closing windows, and others may further yet exacerbate the uneven temperature distribution throughout the building. Uneven temperature distributions may cause the HVAC system to work harder than it needs to otherwise, which may lead to premature wear of components and higher operating costs.

Certain systems exist to try and improve the distribution of heating and cooling throughout a building. For example, static dampers may be installed to affect air flow rates to different air flow outlets (e.g., vents or registers). However, static dampers by their nature cannot account for dynamic activities in a building, such as those described above.

As another example, electronic dampers may be installed to affect air flow rates on a more dynamic basis. However, such systems tend to require standalone processing systems to control the dampers. For example, such systems may require a central "hub" and a sufficient networking system to maintain constant communication with each electronic damper, as well as in some cases a connected "cloud" application to provide commands to the hub. Without a centralized control system for such systems, the electronic dampers are no better than the aforementioned static dampers. Further yet, such systems are expensive, have significant power requirements, and require time-consuming and complex setup procedures that are beyond the capability of an average HVAC system user.

Accordingly, what is needed is a system for HVAC balancing and optimization that can address the shortcomings of existing solutions.

BRIEF SUMMARY

Certain embodiments provide a system including a first active control device, comprising: a flow control element; one or more sensors; a network interface configured to connect to a mesh network; a memory comprising computer-executable instructions; and a processor configured to: execute the computer-executable instructions; receive local sensor data from the one or more sensors; receive remote sensor data from a remote sensing device; control a position of the flow control element based on one or more of the local sensor data or the remote sensor data; store the local sensor data and remote sensor data in the memory; and transmit the local sensor data and the remote sensor data to a second active control device via the mesh network.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 3A-3D depict different views of one example of an active control device.

FIGS. 4A-4E depict different views of another example of an active control device.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
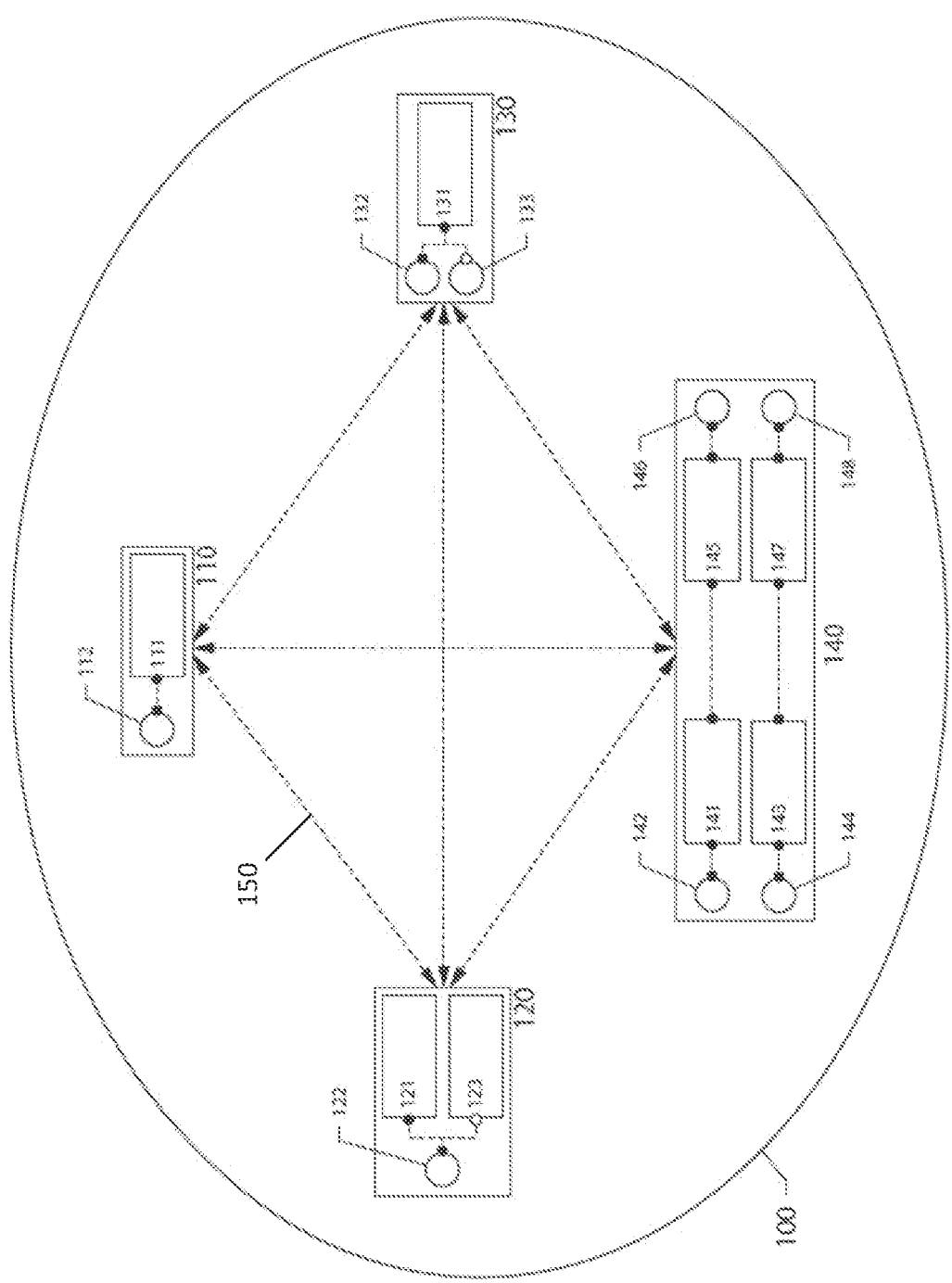
FIG. 1 depicts an example HVAC balancing and optimization system.

Aspects of the present disclosure provide a heating, ventilation, and air conditioning (HVAC) balancing and optimization system. Embodiments of the HVAC balancing and optimization system described herein may be used, for example, in any structure in which an HVAC system is present, such as a home, an apartment, and other residential structures, as well as commercial structures, such as office buildings, stores, and the like.

Aspects of the HVAC balancing and optimization system described herein may be used with a wide variety of HVAC systems, including forced-air heating and/or air conditioning, radiant heating system, split-units, heat pumps, electric or gas wall or baseboard heaters, portable and window-mounted units, combinations of the aforementioned systems, and others as are known.

Embodiments of the HVAC balancing and optimization system described herein may include a combination components, including, for example, active control devices, sensing devices, and interface devices in wireless communication with one another (e.g., in a mesh data network) and operating without the need for a centralized controller (e.g., a hub) or external control service (e.g., a remotely hosted application).

Elements of an HVAC Balancing and Optimization System

Embodiments of the HVAC balancing and optimization systems described herein may include a mesh network of devices that monitor environmental conditions and adjust active control devices to balance and optimize an existing HVAC system.

A mesh network is a local network topology in which the networked nodes connect directly, dynamically, and non-hierarchically to as many other nodes as possible and cooperate with one another to efficiently route data to and from clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs. Because HVAC balancing and optimization systems may include components spread widely throughout a building (e.g., sensors in various rooms, interfaces with existing HVAC equipment, active dampers and vents in various places, and the like), a mesh network is a beneficial topology for communicating data amongst the systems components.

Components of the HVAC balancing and optimization systems described herein may include one or more data communication capabilities, such as wireless data communication equipment to communicate via wireless communication protocols, like Bluetooth Mesh, Wi-Fi, Thread, or others as are now known and later developed. For example, HVAC balancing and optimization system components may be configured to automatically join a mesh network using a Bluetooth mesh protocol or another mesh wireless protocols in an FCC approved transmission band.

HVAC balancing and optimization systems described herein may include one or more active control devices configured to actively affect the amount of heating or cooling applied to a given space. Generally, an active control device may include a flow control element. For example, the flow control element may comprise a movable damper to control the amount of air flow through the active control device. As another example, the flow control element may comprise a valve to control the flow of a cooling or heating liquid flowing through the active control device, such as into a radiator. As yet another example, a flow control element may comprise an electronic circuit configured to control the flow of current to a heating element, such as a may be found in in-floor or baseboard type heating systems. Notably, these are just some examples, and others are possible.

In some implementations, active control devices may also include a sensing element, which may include one or more local sensors. For example, a local sensor, such as an air flow sensor may measure air flow through a duct or vent, a fluid flow sensor may measure fluid flow through a radiator, a gas flow sensor may measure gas flow through a valve to a burner, and a current flow sensor may measure current flow to an electric baseboard heater.

Active control devices may also include environmental sensors, such as temperature sensors, pressure sensors, humidity sensors, air quality sensors, volatile organic compound sensors, or toxic substance sensors (e.g., carbon monoxide sensors, carbon dioxide sensors, and radon gas sensors), flammable gas sensors (e.g., propane, methane, and natural gas), and others.

In some implementations, active control devices may be powered by an onboard power source, such as a battery or capacitor. The onboard power source may be charged by an energy harvesting device, such as a device for converting kinetic energy into electrical energy (e.g., a fan, turbine, or impeller), a device for capturing solar energy, a device for capturing wireless energy (e.g., radio frequency (RF)), a device for capturing thermal energy, and others. In other implementations, the active control devices may be powered by existing low voltage or mains voltage power systems.

In some implementations, active control device include a processor for running software to manage the active control device. The processor may also be configured to collect data from local sensors and share it with other active control devices via the mesh network.

Further, the processor in an active control device may be configured to store data regarding its flow control element status (e.g., a damper or valve position setting, or other flow setting), data from its local sensing element(s), and data from other active control devices that are shared on the mesh network. In some implementations, an active control device may maintain a data log, or database, or other data repository, comprising data regarding its own condition and sensors as well as data regarding other active control devices and sensing elements in the HVAC balancing and optimization system.

HVAC balancing and optimization systems described herein may also include one or more sensing devices.

For example, sensing devices may include environmental sensors, such as temperature sensors, humidity sensors, air quality sensors, volatile organic compound sensors, or toxic substance sensors (e.g., carbon monoxide sensors, carbon dioxide sensors, and radon gas sensors), flammable gas sensors (e.g., propane, methane, and natural gas), etc. Sensing devices may also include motion or occupancy sensors.

In some implementations, sensing devices may be paired to one or more active control devices, such as when the active control device and sensing device are in the same room or same general area (e.g., on one side of a room having more than one active control devices). Similarly, multiple active control devices may be paired to a single sensing device, such as when the sensing device is located in a position between the active control devices, or in a location that is affected by the active control devices (e.g., the center of a room having multiple active control devices).

In some implementations, a sensing device may automatically pair to an active device, for example, based on proximity. In other implementations, the sensing device may be paired to an active device using a near field communication (NFC) process. In yet other implementations, the sensing device may be paired to an active device using an application configured to interface with the HVAC balancing and optimization system, such as an application running on a portable electronic device.

When initially paired to an active control device, a sensing device may be programmed with a unique identifier (UI) as part of a low-level encryption aimed at preventing cross-system interference and erratic control (such as in an apartment building or condo complex where multiple dwellings are within RF system range).

Once paired, the sensing device may be placed in, for example, a location within a room that is representative of the typical temperature experienced by occupants in that room. For example, the sensing device may be placed at an intermediate height in the room representative of the height of occupants of the room, and may be placed away from windows, doorways, electronic equipment, active control devices, or other sources of temperature fluctuation.

Active control devices may receive data from sensing devices and make that data accessible to the software run on the active control device. The active control device may likewise share the data from paired sensing devices with other devices on the mesh network.

HVAC balancing and optimization systems described herein may also include one or more HVAC interface devices, which may also be referred to as HVAC system monitors.

In some implementations, an HVAC interface device may interface directly with the control electronics of an HVAC system, such as a control board, control module, control circuit, control printed circuit board, control processor, control ASIC, or similar. The HVAC interface device may interface with the control electronics of the HVAC system to directly enable or disable those system components. For example, the HVAC interface device may be configured to send command signals to the HVAC equipment, such as fans, movable dampers, furnace, compressor, and the like, to activate or deactivate the HVAC equipment. Further, the HVAC interface device may draw power from the HVAC control electronics (e.g., 24V power, such as may power a traditional thermostat wired to the HVAC control electronics).

In some implementations, an HVAC interface device may be wired inline between a thermostat and the HVAC control electronics so that it may intercept commands from the thermostat and pass them through or modify them. In other implementations, the HVAC interface device may bypass completely or even replace a traditional thermostat.

The HVAC interface device may also include wireless data communication capabilities so that it may join the mesh network with other HVAC balancing and optimization system devices, such as other active control devices and sensing devices.

In some implementations, the HVAC interface device includes one or more hardwired sensing devices or probes, which may be installed within the HVAC equipment. For example, the HVAC interface device may include a hardwired pressure sensor or probe that may be installed in the HVAC air handler (e.g., in a manifold or plenum) to monitor pressure in the air handler and to ensure no overpressure condition. The HVAC interface device may also include a hardwired temperature sensor that may likewise be installed in the HVAC air handler. In some implementations, a single sensor or probe hardwired to the HVAC interface device may have the ability to sense multiple conditions, such as pressure and temperature.

HVAC balancing and optimization systems described herein may also include one or more network interface devices.

For example, a network interface device may form a network bridge between a first communication network, such as the mesh network in which the HVAC balancing and optimization system components communicate, and a second network, such as a Wi-Fi or other local area network, which may provide access to other external networks, such as the Internet.

A network interface device, such as a network bridge, may allow for HVAC balancing and optimization system data to be shared outside of the mesh network, as well as for external data to be shared with the HVAC balancing and optimization system. For example, software updates, configuration data and commands, and the like may be shared with the HVAC balancing and optimization system mesh network via the network interface device.

HVAC balancing and optimization systems described herein may also include one or more network extending devices.

For example, a network extending device may include a mesh network repeater node, which provides extended range to the mesh network so that all devices in the HVAC balancing and optimization system are able to share data.

HVAC balancing and optimization systems described herein may also include one or more control interface devices.

Control interface devices may include, for example, portable electronic devices, such as a smart phone or tablet computer, configured with an application for accessing the HVAC balancing and optimization system. Control interface devices may also include other electronic devices installed in a building, such as an in-wall control panel configured with an application for accessing the HVAC balancing and optimization system.

Control interface devices may be configured to access settings and sensor data stored by active control devices as well as sensor data shared on the mesh network.

Further, control interface devices may be configured to provide configuration data, such as settings or files, to various devices in the HVAC balancing and optimization system. For example, control interface devices may be usable to install firmware and software updates on HVAC balancing and optimization system devices, such as active control devices, sensing devices, network interface devices, HVAC interface devices, and the like.

Temperature Balancing Using the HVAC Balancing and Optimization System

Embodiments of the HVAC balancing and optimization system described herein may be configured to interact with an HVAC system to optimize performance of HVAC system components (e.g., air flow settings at vents or fluid flow settings at valves) in order balance room or zone temperatures in a building in which the HVAC system is installed. Beneficially, embodiments of the HVAC balancing and optimization system may be configured to require little or no programming after installation so that lay people may easily install and enjoy the benefits of the system.

Once all active control devices and sensing devices of an HVAC control system are installed, the HVAC balancing and optimization system may perform an initial calibration. During the initial calibration, all active control devices may be set to an unrestricted state (e.g., allowing maximum air flow through a duct or vent, fluid flow through a radiator, or current flow through a heating element) for a set number of HVAC cycles in order to learn the baseline heating and/or cooling characteristics of one or more rooms (or other spaces) controlled by the HVAC system. An HVAC cycle may include the starting and stopping of any one or more components of the HVAC system in order to affect the environment. For example, a cooling HVAC cycle may include activating a compressor unit and a fan unit in an air handler to cause cooled air to flow to rooms controlled by the HVAC system. As another example, a heating HVAC cycle may include activating a burner/furnace and a fan unit in an air handler to cause heated air to flow to rooms controlled by the HVAC system. As yet another example, a heating cycle may include activating remote heating units, such as gas or electric in-floor or baseboard heating units, mini-split units, or the like.

During each HVAC cycle, active control devices may record sensor data provided by local sensors as well as paired sensing devices. In some implementations, an active control device will record (e.g., in a log file or in a database) its local sensor data and/or the sensor data received from paired sensing devices. In some implementations, an active control device may share the recorded sensor data, from its local sensors as well as from paired sensing devices, with other devices in the mesh network (such as other active control devices). In this way, every active control device in the mesh network may have access to and in some cases store (e.g., within an onboard memory) all of the sensor data available in the mesh network.

Because in some implementations all active control devices maintain flow element and sensor element data regarding themselves as well all other active control devices in the mesh network, adding or replacing active control device is made easier. For example, a failed active control device may be removed, and a replacement active control device may be installed. The new active control device may assume the defective unit's unique ID, or generate a new unique ID.

The HVAC balancing and optimization system may detect a new active control device joining the mesh network, and initiate a baseline calibration process. During the next few HVAC cycles, the new active control device may broadcast a status indicator (e.g., "deficient log") and begin rebuilding its own stored data logs from other active control devices in the mesh network sharing their data.

In some implementations, the sensor data may be stored for a set time interval and then deleted, or stored for a set number of HVAC cycles and then deleted.

The sensor data collected from active control devices and paired sensing devices may be used by the active control devices to determine when and how to change the state or condition of an active control devices flow control element. For example, if the data shared by active control devices reveals that some rooms are over-heated and other rooms are under-heated, the active control devices may change flow settings to reduce flow (e.g., of air through a duct or vent) to the over-heated rooms and increase flow to the under-heated rooms.

Changes made by active control devices may affect conditions of the HVAC system, such as pressure in an air handler (e.g., in a manifold or plenum). As above, an HVAC interface device may monitor pressure within the air handler or manifold via hardwired sensors or probes and cause active control devices to, for example, increase airflow at active control devices where flow had been previously reduced. This may prevent damage to the HVAC system, for example, from over-pressure conditions.

Active control devices may also coordinate timing of changes so as to avoid runaway changes or oscillations in the system. For example, the active control devices may go about adjusting flows in the order based on which active control devices are associated with zones, rooms, or other areas that are farthest from the set temperature (e.g., at the thermostat) or the average temperature of other active control devices.

In some implementations, the set temperature for the system may be estimated by the average temperature recorded across all of the active control devices and/or sensing devices. In this way, the HVAC balancing and optimization system may be completely standalone from the existing HVAC system from a control standpoint, but may nevertheless balance and optimize the performance of the existing HVAC system.

Accordingly, data sharing among active control devices, including data from onboard sensors as well as paired sensing devices, allows the HVAC control system to tune itself so that heating and cooling become more uniform and more efficient (e.g., by not over-heating or over-cooling certain areas and vice versa).

Example HVAC Balancing and Optimization Systems

FIG. 1 depicts an example HVAC balancing and optimization system 100. In this example, several devices are depicted to demonstrate various aspects of system 100.

Room 110 is depicted including an active control device 111 paired to a sensing device 112. Note that while described as a room in this example, 110 could be representative of any space or enclosure including HVAC components, such as air vents, floor or baseboard heating elements, or the like.

In this example, active control device 111 includes a flow control element (not shown). As described above, the flow control element may control an airflow, a gas flow, a fluid flow, or an electrical current flow. In the example described in FIG. 1, the flow control element is an airflow control element configured to affect air flow through HVAC ducting. As an example, active control device may be one of the active control devices described below, with respect to FIGS. 3A-3D, 4A-4E, and 5A-5E.

Active control element 111 may also include a sensing element, which may include one or more local sensors. For example, active control element may include temperature, humidity, and airflow sensors, or others as described above.

Active control element 111 is paired to sensing device 112. Pairing of active control element 111 with sensing device 112 may happen via NFC pairing methods, Bluetooth pairing methods, or by use of an application on an electronic device, such as a smartphone. In some cases, a physical button may be activated on active control element 111 and sensing device 112 in order to put them in a discovery and pairing mode, such that no additional devices are necessary to complete the pairing.

Sensing device 112 may include one or more environmental sensors, such as described above. For example, sensing device 112 may include one or more of: a temperature sensor, a humidity sensor, a proximity or occupancy sensor, or other sensors as described above. In some implementations, sensing device 112 is a single device with multiple integrated sensors, which may simplify installation and setup of sensing device 112 within room 110. Sensing device shares sensor data with active control device 111 via its pairing to active control device 111.

Sensing device 112 may be located remote from active control device 111 in an area more representative of the conditions experienced by room occupants. Often HVAC outlets are placed very high in a room (e.g., in or near the ceiling) or very low in a room (e.g., in the floor or near the baseboard), so a sensor within the active control device may not be representative of the actual temperature in the zone of occupancy of a given room.

In this example, active control device 111 and sensing device 112 are both connected to a mesh communication network 150 represented by the broken line arrows in FIG. 1. In some implementations, sensing device 112 may instead share its sensor data with active control device 111, which may then relay that sensor data to mesh network 150. This may help sensing device 112 preserve battery for longer run operation.

Room 120 includes two active control devices 121 and 123. For example, room 120 may be a larger room with two HVAC outlets (e.g., vents or registers). Like room 110, room 120 includes a single sensing device 122. However, unlike room 110, here sensing device 122 is paired to two active control devices.

For example, sensing device 122 may be in a central location in room 120, between the locations of active control devices 121 and 123 (e.g., two vents or registers), so as to provide a better indication of the conditions for room occupants.

As above, sensing device 122 is configured to share sensor data with both active control devices 121 and 123, though in other implementations sensing device 122 may be configured to share with one or the other of active control devices 121 and 123.

Further as above, active control devices 121 and 123 and sensing device 122 are configured to communicate in and share data with other devices in system 100 via mesh network 150.

Room 130 includes one active control device 131 and two sensing devices 132 and 133. For example, room 130 may be a room with an irregular shape or with some other restriction that affects the ability of an HVAC outlet to evenly heat or cool the room. Thus, sensing devices 132 and 133 may be distributed throughout the room in order to have a better understanding of the actual conditions in room 130.

In cases where an active control device, such as 131, receives data from multiple sensing devices, such as 132 and 133, the active control device may average or otherwise weight the values from each sensing device when performing balancing and optimization operations. This may prevent over-heating or over-cooling a room when one area of the room is unevenly affected by an outside condition (such as an open window near one of the sensing devices).

Thus, rather than being in a central location, sensing devices 132 and 133 may be in different locations in room 130 meant to be representative of the average conditions for room occupants in various different locations in the room.

Sensing devices 132 and 133 are configured to share sensor data with active control devices 131. In other implementations, one of sensing device 132 or 133 may be paired with active control device 131 and share data with it, and the other sensing device may share data on wireless mesh network 150 without sharing the data directly with active control device 131.

Room 140 includes four active control devices 141, 143, 145, and 147, each paired with one sensing device, 142, 144, 146, and 148, respectively. For example, room 140 may be a relatively large room, such as a ballroom, conference room, classroom, or the like, with four HVAC outlets (e.g., vents or registers).

In this example, each of sensing devices 142, 144, 146, and 148 may be placed in an area of influence of active control devices 141, 143, 145, and 147, respectively. For example, where active control devices 141, 143, 145, and 147 control airflow through an HVAC duct, sensing devices 142, 144, 146, and 148 may be placed in an area influenced by the respective HVAC air flows out of those ducts.

As above, active control devices 141, 143, 145, and 147 share data on wireless mesh network 150, which may include sensor data from local sensors (e.g., integral with each active control device) as well as from paired sensor devices.

Each device sharing sensor data in wireless mesh network 150 may maintain sensor data in a local data store. For example, active control device 111 may store sensor data and flow control element data (e.g., position or setting data) in a local memory, such as a non-volatile flash memory. Active control device 111 may also store other active control devices' shared sensor data and shared flow control element data. Thus, each active control device may seek to stay in data synchronization with every other active control device in network 150. In this way, each active control device in network 150 knows the status of every other active control device so that changes to flow settings associated with one active control device can be correlated with changes to other aspects of the system.

Active control devices may be configured to share data at a set interval, such as once a second or once a minute or the like. This interval may be configured to balance data flow and storage requirements with reactivity of the system. From this data sharing, each individual active control device can correlate flow control element data with sensor data to determine optimal flow control element settings in order to balance conditions in rooms 110, 120, 130, and 140.

For example, rooms 110, 120, 130, and 140 may all be within a single structure, such as a home, and active control devices 111, 121, 123, 131, 141, 143, 145, and 147 may all share data and adjust their respective control flow elements to balance temperature in each room. In this way, the HVAC system (not shown) may operate most effectively (in terms of reaching target temperatures in each room) and most efficiently (e.g., by avoiding over-heating and over-cooling of any given room).

Though the active control devices in rooms 110, 120, 130, and 140 are described above as controlling the flow of air from HVAC outlets (e.g., vents or registers), in other implementations, active control devices in rooms 110, 120, 130, and 140 may control other types of flows, such as flows of electricity to electric heating elements, fluid flows to radiators, and the like.

Moreover, the active control devices in rooms 110, 120, 130, and 140 may be different types (i.e., they need not all be the same to participate in mesh network 150). For example, active control devices in some rooms many control airflow through forced air HVAC outlets, while active control devices in other rooms may control current flow to electric heating elements. Indeed, even within a single room, active control devices may be of mixed type. This allows significant flexibility in design and control of an HVAC system. For example, an electric baseboard heater may be added to a room with insufficient forced air heating and controlled as part of system 100. Many other configurations are possible. In general, the active control devices may be agnostic to their type because they are only aware of the relationship between their flow control elements and the sensed data from their local and paired sensing devices.

As depicted in FIG. 1, HVAC balancing and optimization system 100 may act completely independently of any centralized network and control structure. For example, system 100 creates an ad-hoc mesh network 150 without the need for any common routing or switching network equipment.

Similarly, system 100 works without any hub or other sort of centralized controller and without any remote application service. Rather, the devices within system 100 self-organize and self-regulate based on shared data in the network. In this way, system 100 can be installed alongside existing HVAC systems without any regard for the type of HVAC system, its configuration, or the like. In fact, system 100 may operate without any other existing network infrastructure, so it is suitable for any structure regardless of the availability of network connectivity.

Figure 2:
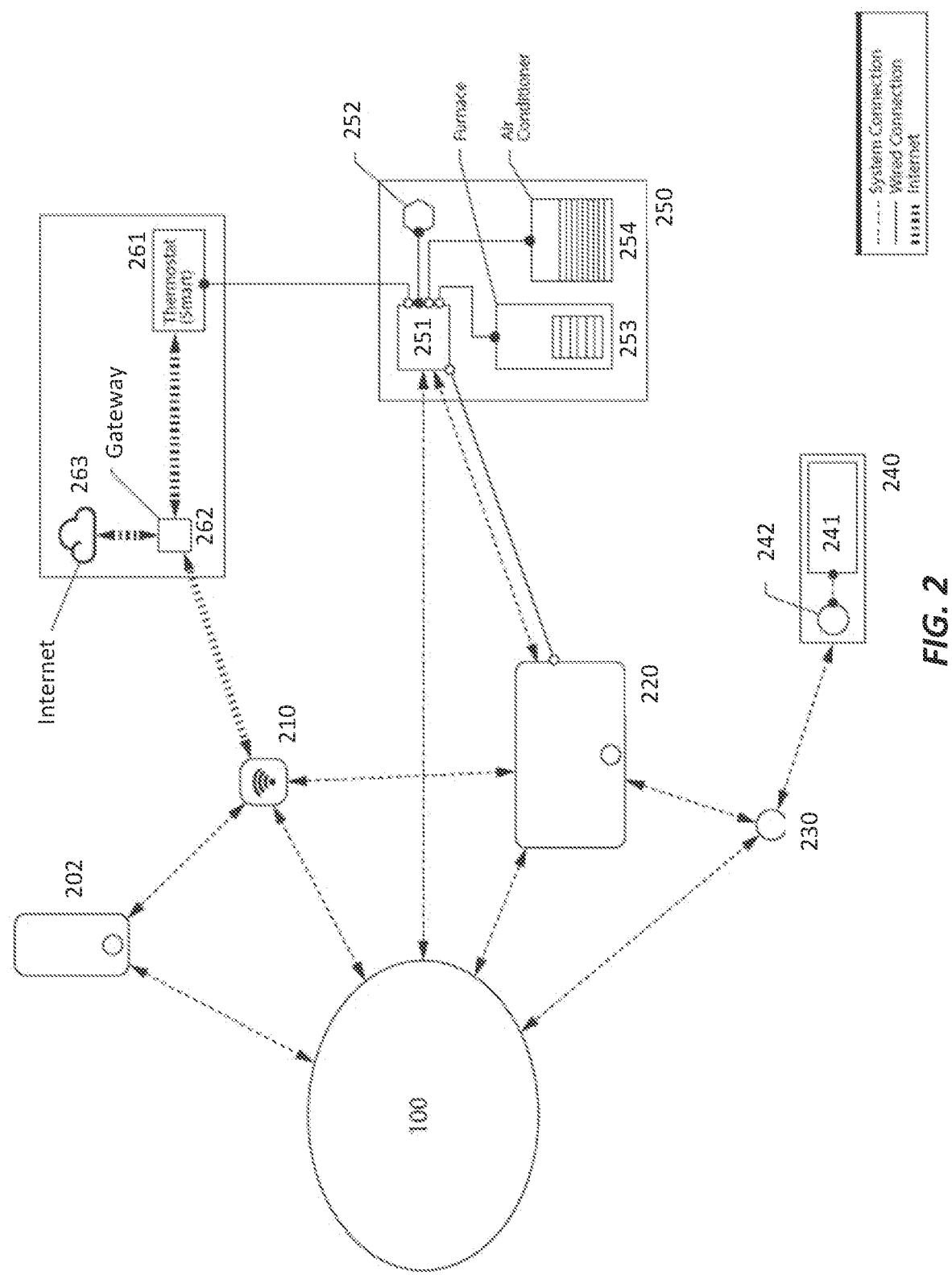
FIG. 2 depicts additional optional aspects of an HVAC balancing and optimization system.

FIG. 2 depicts additional optional aspects of an HVAC balancing and optimization system. The components depicted in FIG. 2 are not necessary for an HVAC balancing and optimization system, such as described with respect to FIG. 1, but may add additional functionality to such a system.

For example, network adapter 210 provides a bridge from the mesh network to a second wireless network protocol, such as an 802.11 (e.g., Wi-Fi) network. As such, network adapter 210 provides a means for data from the mesh network of system 100 to be shared outside of the mesh network, and likewise for data from outside the mesh network of system 100 to be shared within the mesh network. The second network may have access through a gateway 262 to an external wide area network, such as the Internet 263. In this way, data from system 100 may be shared to external storage and processing devices, such as cloud storage and cloud processing services.

Network adapter 210 may also provide a way for external data to be shared with system 100. For example, local weather data gathered from internet sites may be provided to system 100, which may be used by active control devices to modify operational parameters. For example, the amount of heating airflow may be increased to account for severely cold weather.

Electronic device 202 may be configured to run an application for sharing data with aspects of system 100 as well as the additional aspects depicted in FIG. 2. For example, electronic device 202 may be a portable electronic device, such as a smartphone or tablet computer, or another sort of electronic device, smart speaker, or other smart device or appliance. Electronic device 202 may utilize the application to provide data, configurations, settings files, software, firmware, and the like to aspects of system 100 via its connection to the mesh network and/or through network interface 210 (e.g., if electronic device 202 is only connected to a local area network instead of the mesh network of system 100). For example, electronic device 202 may be used to load configuration settings into various active control devices, or to set limits, alarms, or other sorts of operational parameters.

Notably, configuration of devices in system 100 via electronic device 202 is not required, but is rather an option to provide additional control and capability of specific devices in system 100. In some cases, electronic device 202 may directly connect to individual devices, such as individual active control devices, via a wireless data connection, such as Bluetooth.

Electronic device 202 may utilize its own networking capability to connect to the mesh network (e.g., via a Bluetooth or Wi-Fi chipset) and may also connect directly to the second network (e.g., a Wi-Fi network) for access to the Internet 263 by way of gateway 262. Further yet, electronic device 202 may have additional wireless communication capabilities, such as cellular, to directly access Internet 263.

Once connected with system 100 via a suitable data connection, electronic device 202 may provide configuration data, such as room name, room dimensions, numbers of doorways or windows in the room, aspects regarding the windows (e.g., double or single paned), aspects regarding the building (e.g., type of insulation, build date, build material, etc.) relative distance from HVAC equipment 250 (e.g., using a scale such as 1-5), relative or actual temperature offset compared to other rooms, number of windows in a given room, and other characteristics that may affect the environment in a room.

Network extender 230 extends the range of the mesh network of system 100 to additional devices that may not otherwise be in range. For example, network extender 230 allows system 100 to connect with active control device 241 and sensing device 242 in room 240, which may be separated from rooms in system 100 by a significant distance, or may even be in a completely separate structure. Note that while room 240 is not shown within the ring of system 100, it may be considered part of system 100 by virtue of its connection to the mesh network of system 100.

System interface device 220 may be another electronic device, such as a wall-mounted tablet or another smart home device (e.g., an AMAZON ALEXA®), that has a display screen (e.g., a touchscreen) and provides a graphical user interface to present data regarding system 100, as well as other aspects depicted in FIG. 2. For example, by joining the mesh network described with respect to FIG. 1, system interface device 220 gains access to all shared data in the network, including position or setting data associated with active control devices' flow control elements as well as sensor data (e.g., temperature, humidity, air quality, and others) associated with active control devices' local sensors and paired sensing devices.

Further, like electronic device 202, system interface device 220 may allow for a user to interact with and provide settings and other parameters to various aspects of system 100, such as providing for flow control limits, overrides, and the like. In some cases, system interface device 220 may have on-board memory for recording data shared on the mesh network of system 100. In some cases, the memory may be removable, such as a removable SD card, so that the data may be analyzed on a different processing system.

System interface device 202 may further provide a software integration platform for system 100 to share data with other smart home systems, such as existing home automation systems.

In some implementations, system interface device 220 may take the place of or bypass a thermostat, such as thermostat 261. For example, system interface device 220 may interface directly via wired connection or via wireless connection to an HVAC interface module 251, as depicted in the example of FIG. 2.

HVAC interface module 251 may interface directly with the control electronics of an existing HVAC system 250. Thus, HVAC interface module 251 may be able to activate various components of existing HVAC system 250, such as furnace 253 and air conditioner 254, as well as report the status of the various components of existing HVAC system 250 back to other aspects of the HVAC balancing and optimization system (e.g., system 100).

HVAC interface module 251 also includes a hardwired sensing probe 252, which may include one or more sensing elements, such as temperature and pressure.

As depicted in FIG. 2, sensing probe 252 may be installed directly within the existing HVAC equipment, such as in the air handler, manifold, or plenum near HVAC system 250's fan (not depicted). In this way, interface module 251 can monitor performance of HVAC system 250 as well as to protect existing HVAC system 250 from dangerous conditions, such as overpressure.

For example, if active control devices within system 100 (in this example, airflow control devices) restrict airflow too significantly while the fan of existing HVAC system 250 is running, pressure may build up in the air handler (or plenum or manifold) and cause damage to the fan, the ducting, the seals between various HVAC elements, and other components of HVAC system 250. Because HVAC interface module 251 is connected to the mesh network and/or system interface device 220, which is connected to the mesh network, HVAC interface module 251 may send override commands to active control devices connected to the mesh network (e.g., in system 100) to reduce flow restriction so as to reduce pressure in the HVAC air handler.

Because HVAC interface module 251 is directly interfaced with HVAC system 250, it may draw power from HVAC system 250, such as 24V power. Further, sensing probe 252 may draw power from HVAC interface module 251 by way of existing HVAC system 250's power.

HVAC interface module 251 may also be connected inline between thermostat 261 and existing HVAC system 250. In this way, HVAC interface module 251 may intercept commands from thermostat 261, modify or pass through those commands, or even totally bypass thermostat 261. In some examples, HVAC interface module 251 may receive set temperature data from thermostat 261 and provide that data to other aspects of system 100.

Example Active Control Devices

FIGS. 3A-3D depict different views of one example of an active control device 300. In this example, active control device 300 is configured to fit within HVAC ducting that has a circular cross-section and control the air flow through the ducting.

Active control device 300 includes flow control element 306 (shown in FIG. 3D) which rotates about an axis 310 (shown in FIG. 3D) running through the center of active control device 300 in order to open or close the air flow channels 304 disposed in the body 302 of active control device 300.

FIG. 3B depicts a view down axis 310 (shown in FIG. 3D), which shows the plurality of air flow channels 304. As flow control element 306 is rotated around the inside of body 302, air flow channels 304 close off so as to limit the flow of air through active control device 300.

FIG. 3C depicts a side view of active control device 300 showing the direction of airflow 308 through active control device 300, for example, as motivated by an upstream HVAC fan. While the direction of airflow generally stays the same, the amount of airflow through active control device 300 will change significantly based on how open or closed air flow channels 304 are based on the position of flow control element 306.

FIG. 3D depicts an isometric view of active control device 300. Flow control element 306 is depicted inside of body 302 and configured to rotate about axis 310 in order to adjustably open and close air flow channels 304. Flow control element 306 may be moved by any suitable means, such as by a servo, small motor, moveable mechanical linkage, or the like. In this example, flow control element 306 substantially matches the contour of the curved portion of body 302 and has matching air flow channels that may be either aligned with the flow channels in body 302 or moved to block those channels, thereby controlling the flow through active control device 300.

In this example, active control device 300 includes a fan 312 that may be used to harvest energy from forced airflow. The harvested energy may be used to charge a power storage device, such as a battery or capacitor (not shown), which is used to power various electrical components of active control device 300 (not shown).

As described above, active control device 300 may include electrical components, such as a processor for running software configured to control the action of active control device 300 within an HVAC balancing and optimization system. The electrical components may also include a communication device, such as a chip enabling communication between active control device 300 and other devices within an HVAC balancing and optimization system mesh network.

The electrical components may further include one or more local sensing elements, such as described above. In this particular example, fan 312 may act as both a power generator and an airflow sensor (based on the speed of the fan as air passes by it and motivates the blades). Though not depicted in FIG. 3D, in some implementations, the power storage device and certain electrical components may be located in a cylindrical enclosure (320 shown in FIG. 3B) running along axis 310 between fan 312 and the output side of body 302.

In this example, fan 312 includes a fan shroud 314, which increases the effectiveness of the fan at capturing airflow and generating power. Further in this example, the shroud is supported by aerodynamic support elements 316, which are in-turn connected to an inner, static surface 318 of active control device 300.

Though not depicted in FIG. 3D, sensing elements may be integrated into or attached to elements of active control device 300, such as support elements 316, shroud 314, and inner surface 318.

FIGS. 4A-4E depict different views of another example of an active control device 400. In this example, active control device 400 is configured to fit within an HVAC outlet duct, which has a rectangular cross-section, such as are regularly used in both commercial and residential buildings.

FIG. 4A depicts an isometric view of active control device 400 with a wall mount flange 412 connected to a body portion 402.

Active control device 400 also includes a power storage device and electronics housing 416. The power storage device and electronics in housing 416 are used to control the flow control element 406, which rotates about axis 410 in order to control flow through flow channels 404 (e.g., in FIG. 4D).

FIG. 4B shows a cross-sectional view along the line A-A in FIG. 4C. As shown in FIG. 4B, flow control element 406 (shown in FIG. 4B) moves in the directions of arrow 414 in order to affect airflow 408 from the duct side to the room side of active control device 400.

FIG. 4D depicts the example air flow channels 404, which may be selectively opened or closed by rotating flow control element 406.

FIG. 4E depicts an example of a removable module 416 that may include enclosure 418 as well as a fan in some implementations. As depicted in FIG. 4E, module 416 may be equipped with a fan 412 that may be used to harvest energy from forced airflow. The harvested energy may be used to operate the control electronics as well as to charge the power storage device, such as a battery or capacitor (not shown), stored in enclosure 418. Thus, module 416 shown in FIG. 4E with fan 412 is an alternative to module 416 in FIG. 4A, which does not have a fan. The removable and replaceable modules may allow for easy servicing of active control device 400 as well as easy upgrading of components and capabilities.

As described above, active control device 400 may include electrical components, such as a processor for running software configured to control the action of active control device 400 within an HVAC balancing and optimization system (such as described below with respect to FIG. 7A). The electrical components may also include a communication device, such as a chip enabling communication with the HVAC balancing and optimization system mesh network. The electrical components may further include one or more local sensing elements, such as described above. In this particular example, fan 412 may act as both a power generator and an airflow sensor (based on the speed of the fan as air passes by it and motivates the blades).

Though not depicted in FIGS. 4A-4E, sensing elements (other than fan 412) may be integrated into or attached to elements of active control device 400. For example, temperature and/or pressure sensors may be integrated to measure characteristics of the airflow 408 as it passes through active control device 400.

FIGS. 5A-5E depict different views of another example of an active control device 500. In this example, active control device 500 is configured to fit within a rectangular HVAC duct. For example, active control device 500 could be used in a rectangular outlet, such as behind a traditional outlet cover or register, or within other transport ducting (with rectangular cross-section) throughout a building.

Figure 5A:
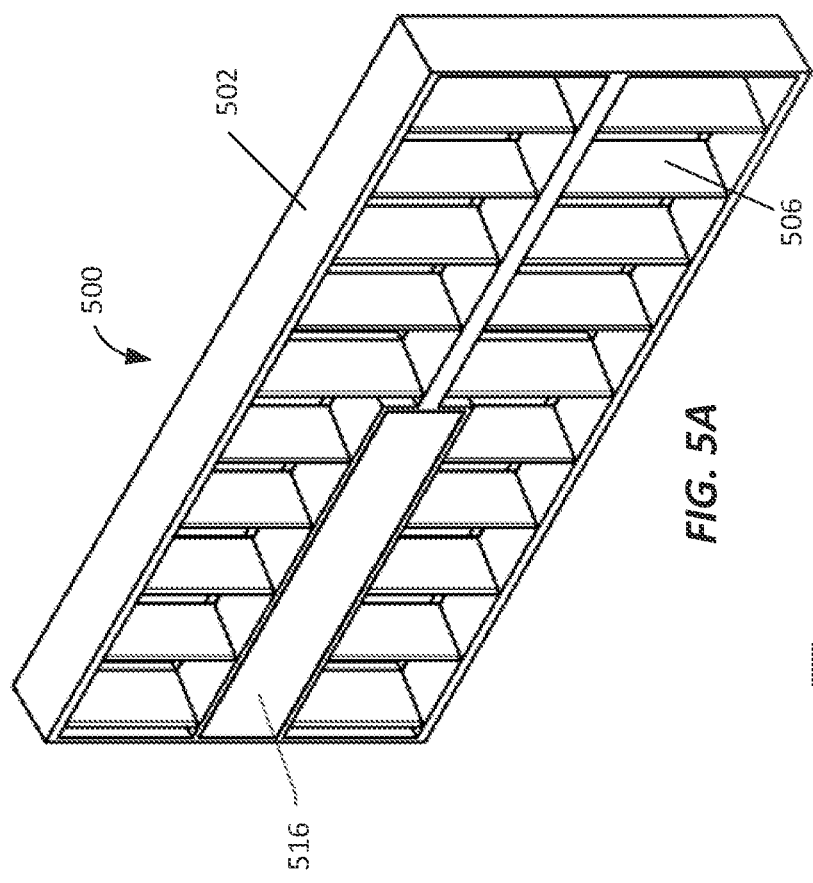
FIGS. 5A-5E depict different views of another example of an active control device.

FIG. 5A depicts active control device 500 with a rectangular body portion 502 as well as a plurality of flow control elements 506, which are discussed below in more detail with respect to FIG. 5D. In this example, active control device 500 includes an enclosure 516, which may enclose a power storage device (e.g., a battery) as well as control electronics (such as described below with respect to FIG. 7A). For example, enclosure 516 may include a processor for running software configured to control the action of active control device 500 within an HVAC balancing and optimization system, such the systems described above with respect to FIGS. 1 and 2. The electrical components may also include a communication device, such as a chip enabling communication with the HVAC balancing and optimization system mesh network. The electrical components may further include one or more local sensing elements, such as described above.

Figure 5B:
Figure 5C:
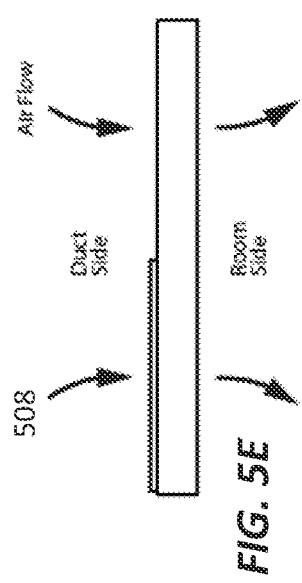

FIG. 5B depicts a side-view of active control device 500. FIG. 5C depicts a front view of active control device 500, which depicts the airflow channels 504, which may be restricted by flow control element 506.

Figure 5D:
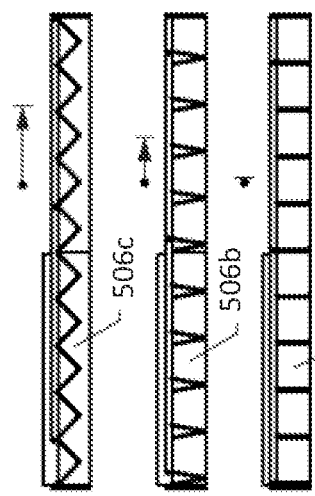

FIG. 5D shows three different cross-sectional views of active control device 500 along the line A-A shown in FIG. 5C. In particular, FIG. 5D depicts flow control element 506 in three different states: 506a, 506b, and 506c. In this example, flow control element 506 includes a plurality of folded elements that can be moved along the direction of arrows 510. As a control element is moved in one direction, the folded elements unfold and therefore restrict more of the flow channels 504. So, for example, flow control element 506a is in a fully folded/unrestricted position such that air may flow freely through flow channels 504. Flow control element 506b is in a partially unfolded/partially restricted position, such that air can still flow through flow channels 504, but at a reduced rate. Finally, flow control element 506c is in a fully unfolded/fully restricted position, such that air flow through flow channels 504 is minimized or completely stopped.

Figure 5E:
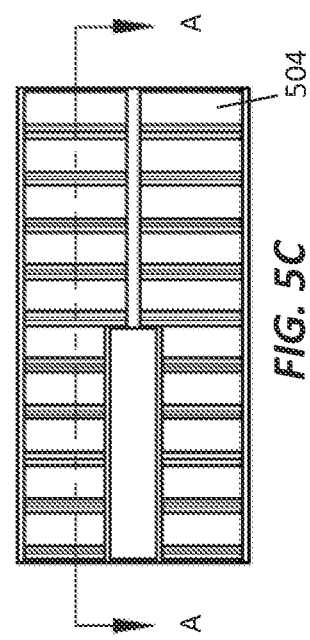

FIG. 5E depicts a top view of active control device 500, which shows the direction of airflow 508 through active control device 500.

The example active control devices depicted in FIGS. 3A-3D, 4A-4E, and 5A-5E may be constructed from a variety of materials, such as plastics, plastic and fiberglass composites, carbon composites, metals, metal alloys, and others. Generally, the material is preferably resistant to a wide range of temperatures and humidity levels. In some cases, aspects of the active control devices may be 3D printed in order to use more complex geometries to improve airflow and noise characteristics.

Example Method

Figure 6:
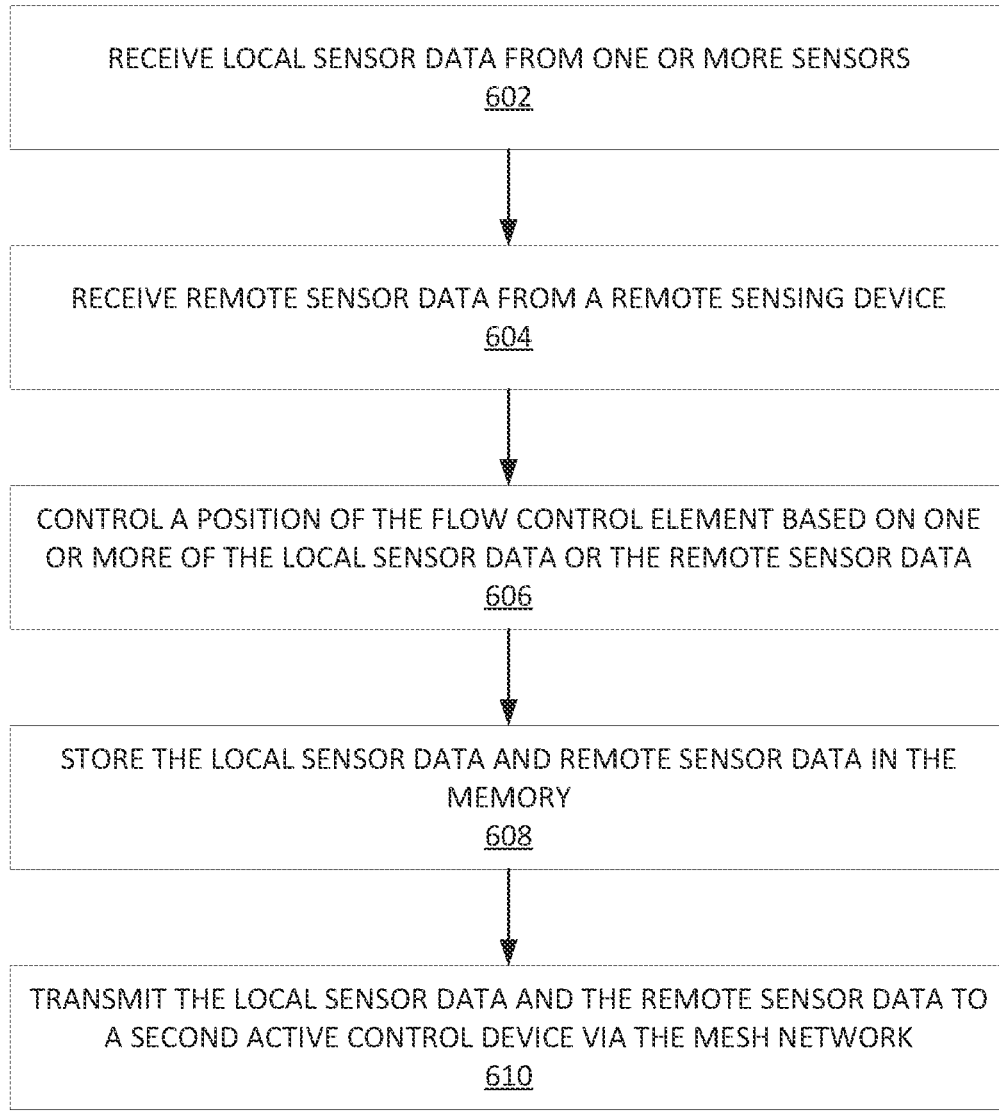
FIG. 6 depicts an example method that may be performed by an active control device.

FIG. 6 depicts an example method 600 that may be performed by an active control device, such as those described herein.

Method 600 begins at step 602 with receiving local sensor data from one or more sensors integral with the active control device. For example, the sensors can include temperature sensors, pressure sensors, humidity sensors, air quality sensors, volatile organic compound sensors, or toxic substance sensors (e.g., carbon monoxide sensors, carbon dioxide sensors, and radon gas sensors), flammable gas sensors (e.g., propane, methane, and natural gas), and others.

Method 600 then proceeds to step 604 with receiving remote sensor data from a remote sensing device. For example, the active control device may receive remote sensor date from a paired sensing device or from other sensing devices within a mesh network, as described above with respect to FIG. 2.

Method 600 then proceeds to step 606 with controlling a position of the flow control element based on one or more of the local sensor data or the remote sensor data. For example, the flow control element may be moved or rotated in a first direction to increase a flow (e.g., of air or fluid) through the active control device, or moved or rotated in a second direction to decrease the flow through the active control device.

Method 600 then proceeds to step 608 with storing the local sensor data and remote sensor data in the memory. For example, as described above, the sensor data may be stored in a repository, such as a log, table, database, or the like, which allows the active control device to analyze conditions in many areas of a building instead of only at the particular active control device.

Method 600 then proceeds to step 610 with transmitting the local sensor data and the remote sensor data to a second active control device via the mesh network. For example, as described above, the local sensor data (e.g., from the first active control device's own sensors) and the remote sensor data (e.g., from a sensing devices paired to the first active control device) may be shared with other devices within the mesh network.

Though not depicted in FIG. 6, method 600 may further comprise receiving sensor data from the second active control device via the mesh network; store the sensor data from the second active control device in the memory of the first active control device; and control the position of the flow control element based on sensor data from the second active control device.

Method 600 may further comprise entering a pairing mode when a physical pairing button is pressed; and pairing with a remote sensing device. Alternatively, method 600 may further comprise receiving a command from a remote electronic device to enter a pairing mode; and pairing with a remote sensing device. For example, the remote electronic device may be running an application configured to interface with the system, as described above with respect to FIG. 2.

Example Active Control Device System and Sensing Device System

Figure 7A:
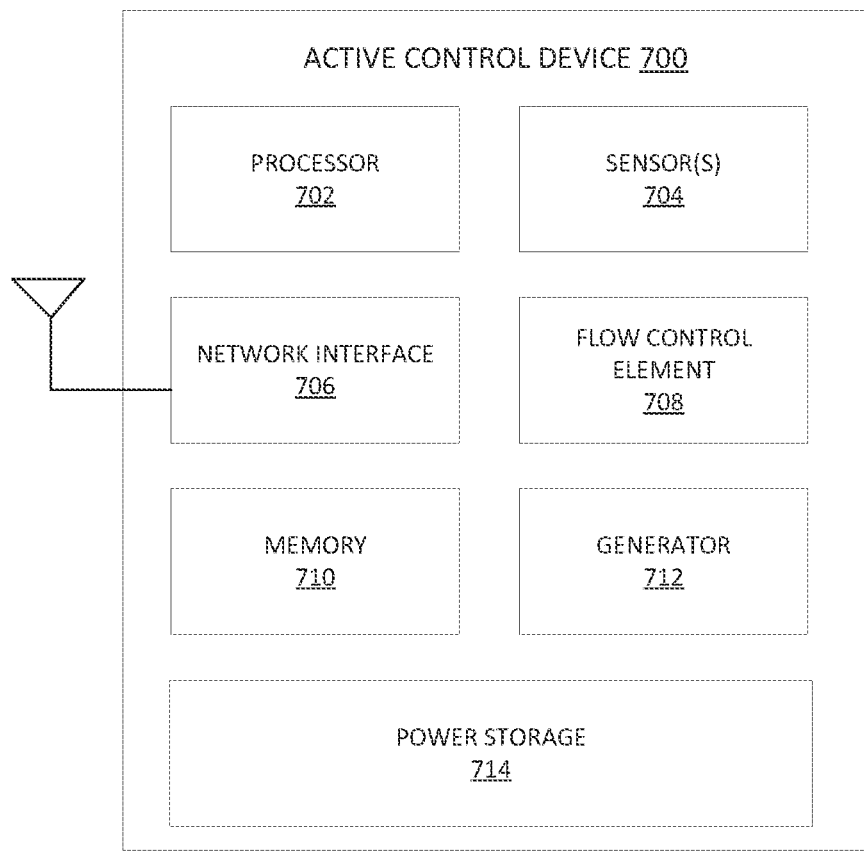
FIG. 7A depicts an example active control device system diagram.

FIG. 7A depicts an example active control device system diagram. In this example, active control device 700 includes a processor 702, which may be representative of one or more processors of any sort. In some examples, processor 702 may be a microcontroller.

Processor 702 is configured to receive data from sensors 704 and execute computer-executable instructions stored in memory 710.

Processor 702 is further configured to share data with a network, such as the mesh network described above with respect to FIGS. 1 and 2, via network interface 706. In some implementations, network interface 706 may be a Bluetooth network interface.

Processor 702 is further configured to control flow control element 708, such as described above. For example, flow control element may be configured to change the position of flow control elements as discussed above with respect to FIGS. 3A-3D, 4A-4E, and 5A-5E. In some implementations, flow control element 708 include a motor, servo, actuator, or other device capable of causing movement of a flow control element in an active control device.

Active control device 700 may include a generator 712, such as a generator fan, solar power generator, heat conversion generator, or the like. Generator may store power in power storage device 714, which may power processor 702, sensors 704, network interface 706, flow control element 708, and memory 710. As described above, in some cases, generator 712 may also be used as a sensor, such as an airflow sensor.

Power storage device 714 may include one or more batteries, capacitors, or other electrical storage devices.

Figure 7B:
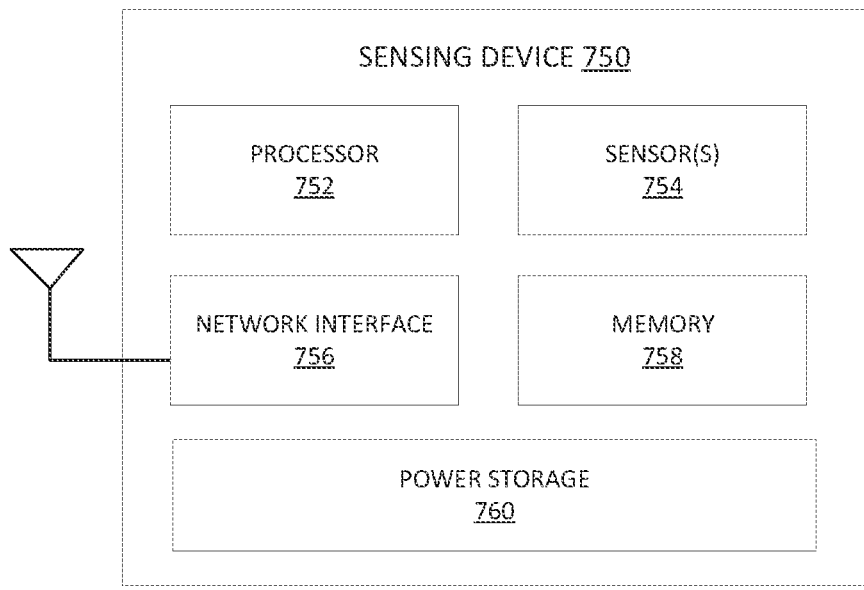
FIG. 7B depicts an example sensing device system diagram.

FIG. 7B depicts an example sensing device system diagram.

In this example, sensing device 750 includes a processor 752, which may be representative of one or more processors of any sort. In some examples, processor 752 may be a microcontroller.

Processor 752 is configured to receive data from sensors 754 and execute computer-executable instructions stored in memory 758.

Processor 752 is further configured to share data with a network, such as the mesh network described above with respect to FIGS. 1 and 2, via network interface 756. For example, sensing device 750 may be paired to and share data with active control device 700 of FIG. 7A. In some implementations, network interface 756 may be a Bluetooth network interface.

Sensing device 752 may further include power storage device 760, which may power processor 702, sensors 704, network interface 706, and memory 710. In some implementations, power storage device 760 may include one or more batteries, capacitors, or other electrical storage devices.

Example System Implementations

In one example, a system includes a first active control device, comprising: a flow control element; one or more sensors; a network interface configured to connect to a mesh network; a memory comprising computer-executable instructions; and a processor configured to:
execute the computer-executable instructions; receive local sensor data from the one or more sensors; receive remote sensor data from a remote sensing device; control a position of the flow control element based on one or more of the local sensor data or the remote sensor data; store the local sensor data and remote sensor data in the memory; and transmit the local sensor data and the remote sensor data to a second active control device via the mesh network.

In some implementations, the processor of the first active control device is further configured to: receive sensor data from the second active control device via the mesh network; store the sensor data from the second active control device in the memory of the first active control device; and control the position of the flow control element based on sensor data from the second active control device.

In some implementations, the one or more sensors comprise a temperature sensor and a pressure sensor, or any other sensor as described herein.

In some implementations, the first active control device further comprises: a power generator; and a power storage device configured to store power generated by the power generator. In some implementations, the power generator comprises a fan, for example, as described above with respect to FIGS. 3B and 4E.

In some implementations, the first active control device is configured to be installed into an HVAC duct having a circular cross-section and the first active control device further comprises: a body comprising a plurality of air flow channels; and a flow control element fitted within a portion of the body and configured to rotate within the body to control exposure of the plurality of air flow channels to airflow in the HVAC duct, such as described above with respect to FIGS. 3A-3D.

In some implementations, the first active control device is configured to be installed into an HVAC duct having a rectangular cross-section, and the first active control device further comprises: a body comprising a plurality of air flow channels; and a flow control element fitted within a portion of the body and configured to rotate within the body to control exposure of the plurality of air flow channels to airflow in the HVAC duct, such as described above with respect to FIGS. 4A-4E.

In some implementations, the first active control device is configured to be installed into an HVAC duct having a rectangular cross-section, and the first active control device further comprises: a body comprising a plurality of air flow channels; and a plurality of foldable flow control element fitted within the body and configured to fold within the body to control exposure of the plurality of air flow channels to airflow in the HVAC duct, such as described above with respect to FIGS. 5A-5E.

In some implementations, the system further includes the remote sensing device, which comprises: a sensor; a network interface configured to connect to a mesh network; a memory comprising computer-executable instructions; and a processor configured to: execute the computer-executable instructions; receive local sensor data from the sensor; and transmit the local sensor data to the first active control device via the mesh network.

In some implementations, the system further includes an HVAC interface module comprising: an HVAC control board connector configured to be connected to an HVAC control board of an HVAC system; a wired sensing probe configured to be installed within a plenum of the HVAC system; a network interface configured to connect to the mesh network; and a processor configured to: receive probe sensor data from the wired sensing probe; and transmit one or more parameters to the first active control device via the mesh network based on the probe sensor data.

The one or more parameter may comprise, for example, data interpretable by the active control devices to change the position of the flow control element to change amount of flow through the active control device. In one example, a parameter may call for increasing flow by a certain percentage, or increasing flow to maximum, as just two examples. Because the active control devices are able to act autonomously based on system date, the parameters from the HVAC interface module may act as just another data input to the control logic for the active control device.

In some implementations, the wired sensing probe comprises a pressure sensor and a temperature sensor.

In some implementations, the processor of the HVAC interface module is configured to transmit the one or more parameters to the first active control device via the mesh network when the probe sensor data indicates a pressure over a threshold pressure.

In some implementations, the one or more parameters cause the first active control device to change the position of the flow control element to allow more airflow through the first active control device.

In some implementations, the processor of the HVAC interface module is connected in-line between the HVAC control board of the HVAC system and a thermostat, such as described above with respect to FIG. 2.

In some implementations, the processor of the HVAC interface module is further configured to: receive control signals from the thermostat; and relay the control signals to the HVAC control board.

In some implementations, the HVAC interface module is configured to bypass the thermostat.

In some implementations, the HVAC interface module is configured to receive power from the HVAC control board of the HVAC system via the HVAC control board connector. The connector could be any sort of electrical connector as are known for providing an electrical connection between a first device and a second device.

In some implementations, the first active control device further comprises a physical pairing button, and the processor of the first active control device is further configured to: enter a pairing mode when the physical pairing button is pressed; and pair with the remote sensing device.

In some implementations, the processor of the first active control device is further configured to: receive a command from a remote electronic device to enter a pairing mode; and pair with the remote sensing device. For example, the remote electronic device could be as described above with respect to FIG. 2.

In some implementations, the system further includes a system interface device, comprising: a display screen; a network interface configured to connect to the mesh network; a memory comprising computer-executable instructions; and a processor configured to: execute the computer-executable instructions; receive local sensor data from the first active control device; receive flow control element position data from the first active control device; receive probe sensor data from the HVAC interface module; and display the local sensor data, flow control element position data, and probe sensor data on the display screen.

Other Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another.

The processor may be responsible for managing the bus and general processing, including the execution of software modules stored on the computer-readable storage media.

A computer-readable storage medium may be coupled to a processor such that the processor can read information from, and write information to, the storage medium. In the alternative, the storage medium may be integral to the processor.

By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system, comprising:
    a first active control device, comprising:
        an air flow control element;
        one or more active control device sensors;
        an active control device network interface configured to connect to a mesh network;
        a physical pairing button;
        an active control device memory comprising computer-executable instructions; and
        an active control device processor configured to:
            execute the computer-executable instructions;
            receive active control device sensor data from the one or more active control device sensors;
            receive remote sensing device sensor data from a remote sensing device, wherein the remote sensing device is not an active control device;
            control a position of the air flow control element based on one or more of the active control device sensor data or the remote sensing device sensor data;
            store the active control device sensor data and remote sensing device sensor data in the active control device memory; and
            transmit the active control device sensor data and the remote sensing device sensor data to a second active control device via the active control device network interface to the mesh network; and
    the remote sensing device, comprising:
        a remote sensing device sensor;

a remote sensing device network interface configured to connect to the mesh network;
a remote sensing device memory comprising computer-executable instructions; and
a remote sensing device processor configured to execute the computer-executable instructions and cause the remote sensing device to:
receive remote sensing device sensor data from the remote sensing device sensor; and
transmit the remote sensing device sensor data to the first active control device via the remote sensing device network interface to the mesh network.

2. The system of claim 1, wherein the active control device processor is further configured to:
receive active control device sensor data from the second active control device via the active control device network interface to the mesh network;
store the active control device sensor data from the second active control device in the active control device memory of the first active control device; and
control the position of the air flow control element further based on the active control device sensor data from the second active control device.

3. The system of claim 1, wherein the one or more active control device sensors comprise a temperature sensor and a pressure sensor.

4. The system of claim 1, wherein the first active control device further comprises:
a power generator; and
a power storage device configured to store power generated by the power generator.

5. The system of claim 4, wherein the power generator comprises a fan.

6. The system of claim 1, wherein:
the first active control device is configured to be installed into an HVAC duct having a circular cross-section, and
the first active control device further comprises:
a body comprising a plurality of air flow channels, wherein the air flow control element is fitted within a portion of the body and configured to rotate within the body to control exposure of the plurality of air flow channels to air flow in the HVAC duct.

7. The system of claim 1, wherein:
the first active control device is configured to be installed into an HVAC duct having a rectangular cross-section, and
the first active control device further comprises:
a body comprising a plurality of air flow channels, wherein the air flow control element is fitted within a portion of the body and configured to rotate within the body to control exposure of the plurality of air flow channels to air flow in the HVAC duct.

8. The system of claim 1, wherein:
the first active control device is configured to be installed into an HVAC duct having a rectangular cross-section, and
the first active control device further comprises:
a body comprising a plurality of air flow channels, wherein the air flow control element comprises a plurality of foldable air flow control elements fitted within the body and configured to fold within the body to control exposure of the plurality of air flow channels to air flow in the HVAC duct.

9. The system of claim 1, further comprising:
an HVAC interface module comprising:
a wired sensing probe configured to be installed within a plenum of an HVAC system;
an HVAC interface module network interface configured to connect to the mesh network; and
an HVAC interface module processor configured to:
receive probe sensor data from the wired sensing probe; and
transmit one or more parameters to the first active control device via the HVAC interface module network interface to mesh network based on the probe sensor data.

10. The system of claim 9, wherein the wired sensing probe comprises a pressure sensor and a temperature sensor.

11. The system of claim 10, wherein the HVAC interface module processor is further configured to transmit the one or more parameters to the first active control device via the mesh network when the probe sensor data indicates a pressure over a threshold pressure.

12. The system of claim 11, wherein the active control device processor is further configured to receive the one or more parameters and cause the air flow control element to change position to allow more air flow through the first active control device.

13. The system of claim 10, further comprising:
a system interface device, comprising:
a display screen;
a system interface device network interface configured to connect to the mesh network;
a system interface device memory comprising computer-executable instructions; and
a system interface device processor configured to:
execute the computer-executable instructions;
receive active control device sensor data from the first active control device;
receive air flow control element position data from the first active control device;
receive probe sensor data from the HVAC interface module; and
display the active control device sensor data, the air flow control element position data, and the probe sensor data on the display screen.

14. The system of claim 9, wherein the HVAC interface module processor is configured to be connected in-line between the HVAC system and a thermostat.

15. The system of claim 14, wherein the HVAC interface module processor is further configured to:
receive control signals from the thermostat; and
relay the control signals to the HVAC system.

16. The system of claim 14, wherein the HVAC interface module is configured to bypass the thermostat.

17. The system of claim 9, wherein the HVAC interface module is configured to receive power from the HVAC system.

18. The system of claim 1, wherein the active control device processor of the first active control device is further configured to:
enter a pairing mode when the physical pairing button is pressed; and
pair with the remote sensing device.

19. The system of claim 1, wherein:
the active control device processor of the first active control device is further configured to:
receive a command from a remote electronic device to enter a pairing mode; and
pair with the remote sensing device.

20. An active control device, comprising:
an air flow control element;
one or more active control device sensors;
a physical pairing button, and an active control device network interface configured to connect to a mesh network;

an active control device memory comprising computer-executable instructions; and an active control device processor configured to:
  execute the computer-executable instructions;
  receive active control device sensor data from the one or more active control device sensors;
  receive remote sensing device sensor data from a remote sensing device, wherein the remote sensing device is not an active control device;
  control a position of the air flow control element based on one or more of the active control device sensor data or the remote sensing device sensor data;
  store the active control device sensor data and remote sensing device sensor data in the active control device memory; and
  transmit the active control device sensor data and the remote sensing device sensor data to a second active control device via the active control device network interface to the mesh network; and
  enter a pairing mode when the physical pairing button is pressed.

* * * * *